United States Patent
Czuhai et al.

(10) Patent No.: US 6,295,612 B1
(45) Date of Patent: Sep. 25, 2001

(54) METHOD AND SYSTEM FOR INDEPENDENT MONITORING OF MULTIPLE CONTROL SYSTEMS

(75) Inventors: Brian Scott Czuhai, Belleville; Charles L. Cole, Livonia; Hui Wang, West Bloomfield, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/546,732

(22) Filed: Apr. 11, 2000

(51) Int. Cl.[7] ................................. G06F 11/277
(52) U.S. Cl. .............................. 714/33; 714/736
(58) Field of Search ..................... 714/30, 33–40, 714/719, 735, 736

(56) References Cited

U.S. PATENT DOCUMENTS

| | | |
|---|---|---|
| 4,392,208 | 7/1983 | Burrows et al. . |
| 4,703,446 | 10/1987 | Momose . |
| 4,933,941 | 6/1990 | Eckard et al. . |
| 4,984,239 | 1/1991 | Suzuki et al. . |
| 5,036,479 | * 7/1991 | Prednis et al. ................ 364/580 |
| 5,055,172 | 10/1991 | Kawamoto . |
| 5,394,544 | 2/1995 | Motoyama et al. . |
| 5,544,310 | 8/1996 | Forman et al. . |
| 5,905,855 | 5/1999 | Klaiber et al. . |

* cited by examiner

Primary Examiner—Robert Beausoleil
Assistant Examiner—Scott T. Baderman
(74) Attorney, Agent, or Firm—Larry I. Shelton

(57) ABSTRACT

A method and system are provided for invoking and monitoring of tests executed by multiple, diverse control systems/algorithms on a main controller which allows a single monitor system to be used to monitor the test results without requiring the monitor system to be programmed or individually tailored to process each unique output from the different possible tests. The present invention achieves independence between the monitor system and each of the specific test applications on the main controller by normalizing the unique results of each of the tests to a common value, thereby allowing the monitor system to generate expected results that can be used with any of the possible tests.

13 Claims, 2 Drawing Sheets

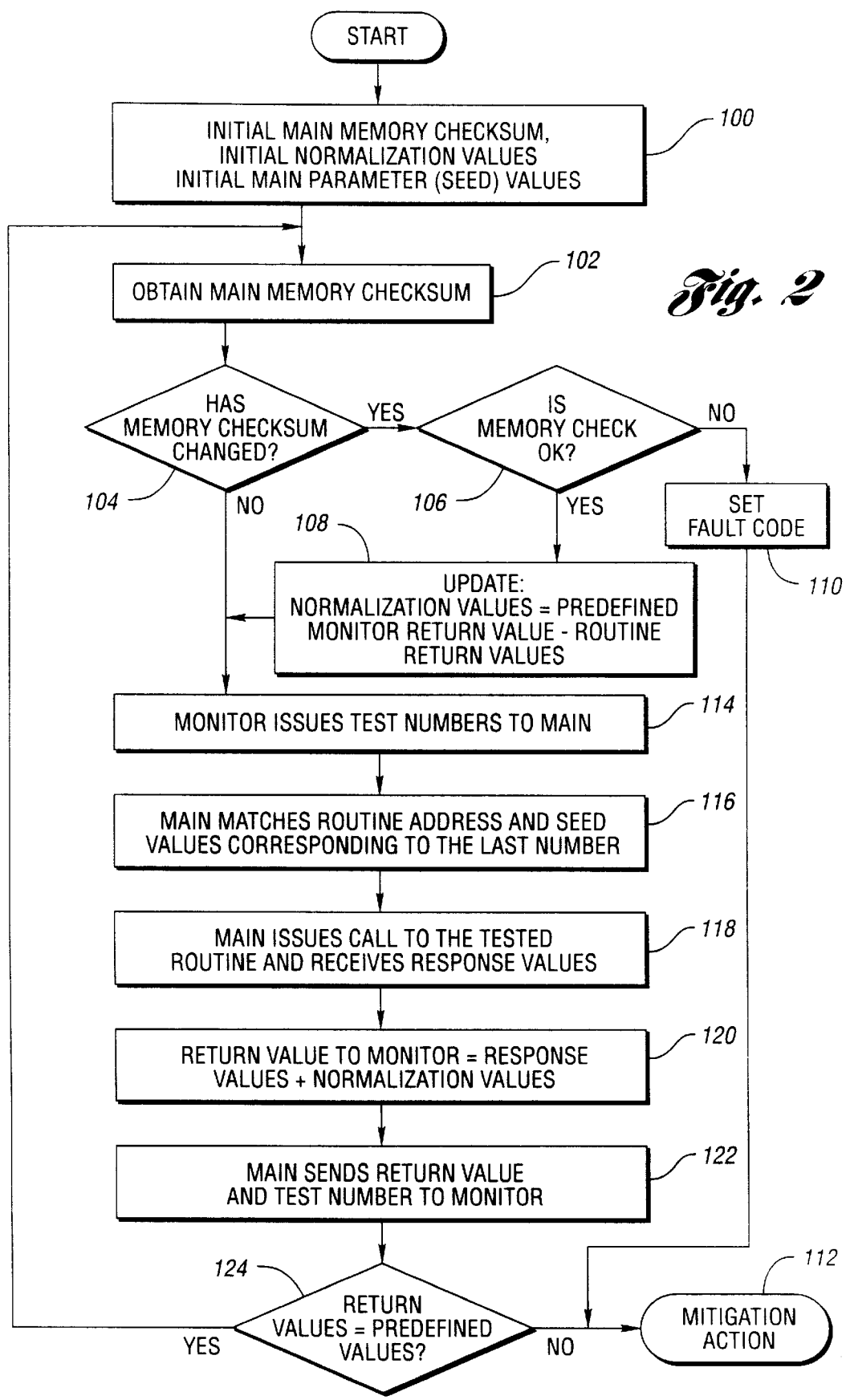

METHOD AND SYSTEM FOR INDEPENDENT MONITORING OF MULTIPLE CONTROL SYSTEMS

TECHNICAL FIELD

The present invention is directed to a method and system of invoking and monitoring tests executed by multiple, diverse control systems/algorithms and, more particularly, to a method and system that allows such invoking and monitoring to be performed by a common monitoring system.

BACKGROUND ART

Generally, many control systems are formed from a main computer system arranged to perform multiple control algorithms. One such application is in an automotive environment. Such control systems can be coupled with a separate monitoring system to provide a testing capability for each of the multiple control algorithms.

However, typical algorithm/software testing methodologies require the monitoring system to provide both an initial parameter stimulus to the main computer system as well as a set of expected results. As a consequence, the test monitoring system must be adapted to maintain application-specific expected results within the monitor itself. Such a requirement significantly adds to the complexity of the monitoring system while also limiting the use of the monitoring system to monitoring and testing specific, predetermined control applications. Therefore, a need exists for a monitoring system that can operate independently of any specific applications to be tested and monitored so as to improve efficiency while reducing overall cost and complexity.

SUMMARY OF THE INVENTION

It is, therefore, an object of the present invention to provide a method and system for invoking and monitoring of tests executed by multiple, diverse control systems/algorithms on a main controller that are independent of any unique specifications required by one or more of the control algorithms.

In accordance with this and other objects, the present invention provides a method and system for introducing normalized values to isolate a monitor processor from unique application specific details of control algorithms located on a main controller. The normalized values can be updated on-board when a memory on the main controller changes, thereby providing complete testing automation.

Since the return values passed to the monitor are normalized to yield a predetermined result, the monitor can provide algorithm monitoring capability without requiring any knowledge about the associated application. Thus, the same monitor design can be used for many different controller applications.

Therefore, in accordance with one aspect of the present invention, a method is provided for invoking and monitoring of tests executed by multiple, diverse control systems/algorithms on a main controller that includes invoking execution of a test by sending a request from a monitor system to the main controller, retrieving expected test results and storing the expected test results in the monitor system, and performing the requested test to generate actual test results. The actual test results are normalized to generate test result values that are not specific to the particular test that was requested. The normalized test result values are then compared to the expected test results to determine whether the actual test results were correct. Normalizing the actual test results is performed by adding a normalization value to the actual test results. In one embodiment, the adding is performed in the main controller, and in another embodiment, the actual test results and the normalization value are sent to the monitor system.

In accordance with another aspect of the present invention, a testing and monitoring system is provided that includes a main controller arranged to execute testing of a plurality of diverse control systems/algorithms, and a monitor system connected to the main controller and operative to invoke execution of a test by sending a request to the main controller, and retrieving expected test results from memory. The main controller is arranged to perform the requested test computing actual test results, and to generate a normalization value associated with the actual test results for combination with the actual test results to produce test result values that are not specific to the particular test that was requested. The monitor system is operative to compare the normalized test result values to the expected test results to determine whether the actual test results were correct.

The above advantages and other advantages, objects and features of the present invention, will be readily apparent from the following detailed description of the best mode for carrying out the invention when taken in connection with the accompanying drawings.

BRIEF DESCRIPTION OF THE DRAWINGS

FIG. 2 is a flowchart illustrating a method of on-board calculation of a normalization value in accordance with the present invention.

BEST MODE(S) FOR CARRYING OUT THE INVENTION

Figure 1:
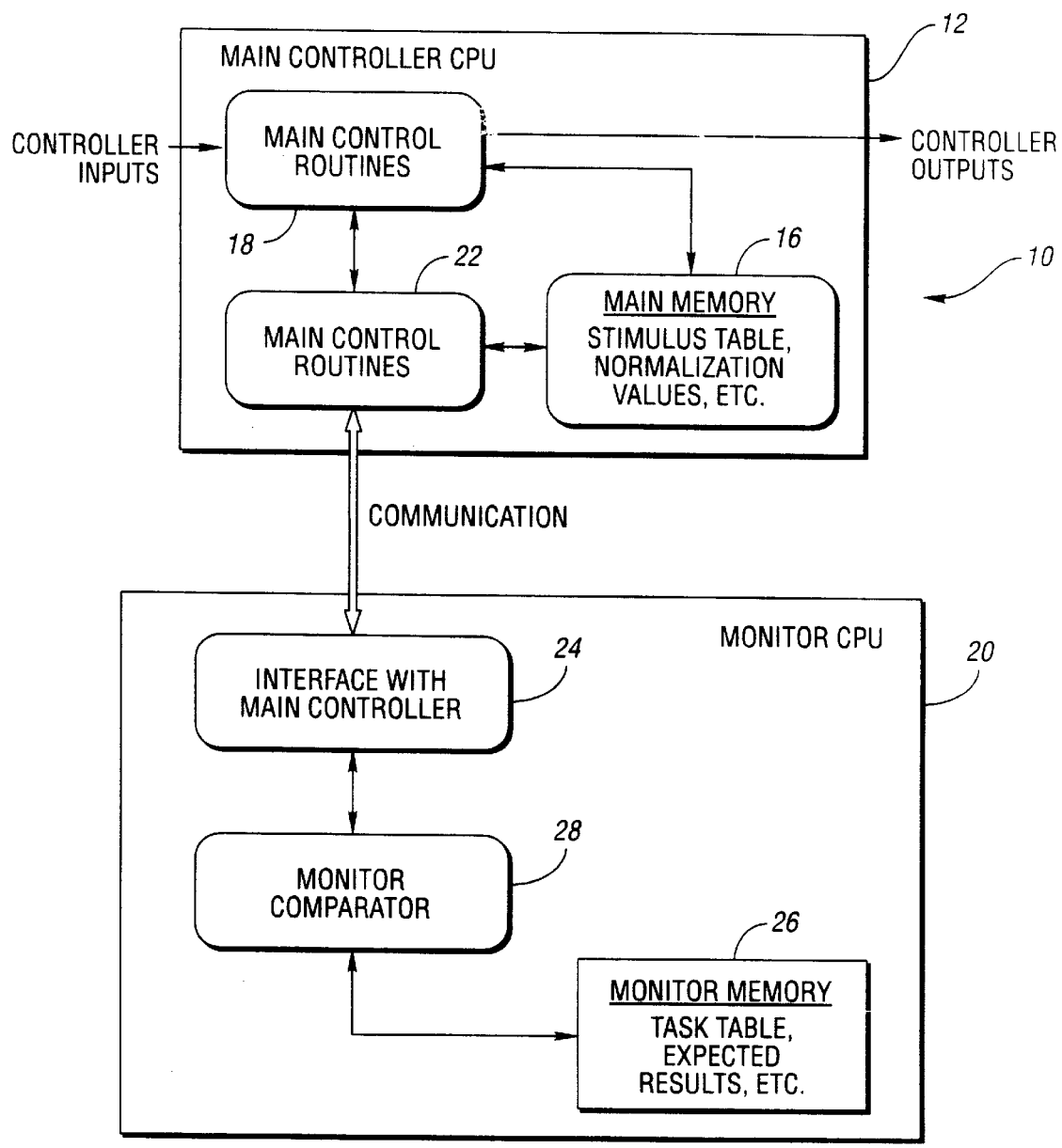
FIG. 1 is a block diagram of a main controller and monitor systems in accordance with one embodiment of the present invention.

Referring to FIG. 1, a test monitoring system 10 in accordance with the present invention includes a main controller/computer system 12 formed from a central processing unit (CPU) 14 having a main controller memory 16, and suitable control algorithms/routines designated at block 18. Memory 16 stores one or more stimulus tables used to effect testing. Memory 16 also stores normalization values as described in more detail below.

Main controller 12 is connected to a monitor system 20 via a communication interface 22 located in the main controller, and a corresponding interface 24 included in the monitor system. Monitor system 20 also includes a monitor memory 26 coupled to a CPU programmed to function as a monitor comparator 28. Memory 26 stores one or more task tables and expected results as part of invoking a test procedure.

More specifically, monitor system 20 is programmed to request or invoke tests on main controller system 12 via communication interface 22 and 24. The monitor system is also programmed to retrieve expected results for the requested test from memory 26. After a requested test is completed by CPU 14, values generated during the execution of the invoked test are transferred back, i.e., "returned" to the monitor system. The monitor comparator is programmed to compare the returned values against the retrieved expected results. If returned values do not match the expected results, the monitor system can generate an output indicating that the invoked test was in error. On the other hand, if the values do match, an output can be generated indicating that the test was completed successfully. In accordance with the present invention, the returned values are normalized to eliminate the need for the monitor system to be uniquely programmed to process the results of specific testing applications.

The overall process of the present invention will now be described in connection with the embodiment shown in the flowchart of FIG. 2. Specifically, as denoted at block 100, before beginning any testing, main controller system 20 initializes each of a memory checksum value, a set of normalization values, and a set of predetermined parameter or seed values. The set of seed values can then be stored in a stimulus table in main controller memory 16. As denoted at block 102, when execution of a test is requested, the main controller CPU obtains the main memory check sum value, and determines at block 104 whether the checksum value has changed. The checksum value is used to provide a check as to whether the contents of a memory have changed, and is typically used as a memory error detection arrangement. Such arrangements are well understood to those skilled in the art.

If the main memory checksum value has changed, then at block 106, the maim memory is checked to determine whether the memory is OK. If so, the normalization values stored in the main memory are updated at block 108 as follows:

> Normalization values=Predefined Monitor return values–Routine generated return values.

If the memory did not check out as being OK, a fault code is set at block 110, and appropriate mitigation action taken at block 112. In addition, it is noted that if the calibration parameters stored in main controller memory 16 change, the normalization values can be correspondingly modified on-board so that the execution of the routine under test still yields the same common result if the routine is executed correctly.

As denoted at block 114, after the normalization values have been updated, the monitor system invokes or initiates execution of a particular test by sending to the main controller one or more test numbers associated with the desired test. The test numbers are arranged to provide an index to the desired test routine, and are selected from a pre-arranged task table stored in monitor memory 26. In a preferred embodiment, values that have been retrieved from the main controller memory are used as initial test parameter values as well as an actual address of a software routine corresponding to the desired test stored in the main controller system. The test initiation process can be triggered periodically or via user or other automated control input. The test will be performed in accordance with programming on the main controller system. The test is initiated using appropriate signaling over the communication interface.

The number associated with the test requested by the monitor system points to and identifies the initial parameter/ seed values and subroutine address the main controller will execute when performing the test. The main controller is arranged to match the routine address and seed values to the received test number(s) as denoted at block 116. Thus, with this arrangement, there is no need for other information to be passed from the monitor system to the main controller. All test stimulus necessary for a specific application remains stored in the main controller memory as well as the associated routine address.

As denoted at block 118, the main controller issues a call to begin execution of the tested routine, and receives the response values generated during the test. Once the routine under test is completed, the results of the routine execution are added to normalization values stored in the main controller memory as denoted at block 120. This process produces normalized results which are then returned at block 122 for comparison to the expected results generated by the monitor system. In the preferred embodiment, the normalization values are calculated by taking the test set number and subtracting the actual result(s) received from the routine under test. The selection of test seed values to exercise the test routine is not restricted.

The normalized values allow the monitor system to use expected results that are not specific to any particular tested routine, but rather, can be applied to any of the possible tests that can be invoked by the monitor system. Normalization of the returned values will not yield the same results for any incorrect execution performed on the main controller CPU.

Thus, as denoted at block 124, a returned, normalized value is compared to an associated expected value, and if they are equal, an appropriate output can be generated indicating that the test results are correct, and the process will return to block 102. Otherwise, an output indicating a negative test result can be generated, and appropriate action to mitigate the error will be taken at block 112.

Thus, through the use of the normalization values for each test set in the main memory, the returned results from the main controller can always be common. This in turn allows the present invention to test diverse applications with a single monitor common to each application. By normalizing application specific results to yield a common expected return value for a run-time routine/algorithm monitoring process, the present invention is able to isolate the monitor system from specific application details for the test results generated by the main controller. In addition, the present invention advantageously reduces calibration complexity because the system can accommodate calculation of correct normalization values on-board during system development.

In an alternative embodiment, instead of returning the same test number as the result(s), the actual test result value(s) could also be returned, along with the corresponding normalization value(s) from the main memory 16, and the monitor system could be arranged to add the two results. This embodiment would require that the actual (i.e., unique) test values be passed back to the monitor system instead of just echoes of the test that was invoked by the monitor system.

It is further noted that allowing the monitor system to be independent of the specific test application on the main controller means that the monitor system will not be able to determine if there was an incorrect calibration stored in the main controller for the tested application. Simply stated, normalizing the test results forces all calibrations to return, or yield, the same result for the monitor system. Thus, insuring correct calibration values or software programmed into the main controller can be handled external to the system/process of the present invention, such as via an end-of-line test when the main controller and monitor system are installed in a vehicle as a PCM device at the assembly.

Thus, while the best mode for carrying out the invention has been described in detail, those familiar with the art to which this invention relates will recognize various alternative designs and embodiments for practicing the invention as defined by the following claims.

What is claimed is:

1. A method of invoking and monitoring of tests executed by multiple, diverse control systems/algorithms on a main controller comprising:

invoking execution of a test by sending a request from a monitor system to the main controller;

retrieving expected test results from a monitor system memory;

performing the requested test to generate actual test results;

normalizing the actual test results to generate test result values that are not specific to the particular test that was requested; and comparing the normalized test result values to the expected test results to determine whether the actual test results were correct.

2. The method of claim 1 wherein normalizing the actual test results comprises adding a normalization value to the actual test results in the monitor system.

3. The method of claim 2 wherein adding the normalization value to the actual test results is performed in the main controller.

4. The method of claim 1 wherein normalizing the actual test results comprises:
   retrieving a normalization value in the main controller that is associated with the executed test;
   sending the normalization value and the actual test results to the monitor system; and
   adding the normalization value to the actual test results in the monitor system.

5. The method of claim 1 wherein invoking a test comprises the monitor system sending at least one test number associated with the desired test to the main controller, wherein the test numbers are arranged to provide an index to the initial parameter values, desired test routine address, and associated normalization values, and are selected from a pre-arranged task table stored in the monitor system.

6. The method of claim 1 wherein invoking a desired test can be triggered by a user or an automated control input.

7. The method of claim 1 further comprising initiating a mitigation action if the actual test results were not correct.

8. A testing and monitoring system comprising:
   a main controller arranged to execute testing of a plurality of diverse control systems/algorithms; and
   a monitor system connected to the main controller and operative to invoke execution of a test by sending a request to the main controller, and retrieve expected test results from memory, wherein the main controller is arranged to perform the requested test and compute actual test results, and to retrieve a normalization value associated with the actual test results for combination with the actual test results to produce test result values that are not specific to the particular test that was requested, said monitor system operative to compare the normalized test result values to the expected test results to determine whether the actual test results were correct.

9. The system of claim 8 wherein the main controller is arranged to add the normalization value to the actual test results, and send the normalized test values to the monitor system.

10. The system of claim 8 wherein the main controller is arranged to send the normalization value and the actual test results to the monitor system, and the monitor system is arranged to add the normalization value to the actual tests results to produce normalized test values.

11. The system of claim 8 wherein the monitor system is arranged to invoke a test by sending at least one test number associated with the desired test to the main controller, wherein the test numbers are arranged to provide an index to the initial parameter values, desired test routine address, and associated normalization values, and are selected from a pre-arranged task table stored in the monitor system.

12. The system of claim 8 wherein the monitor system is arranged to be triggered by a user input to invoke a test.

13. The system of claim 8 wherein the monitor system is arranged to be triggered by an automated control input to invoke a test.

* * * * *